Figure 1:
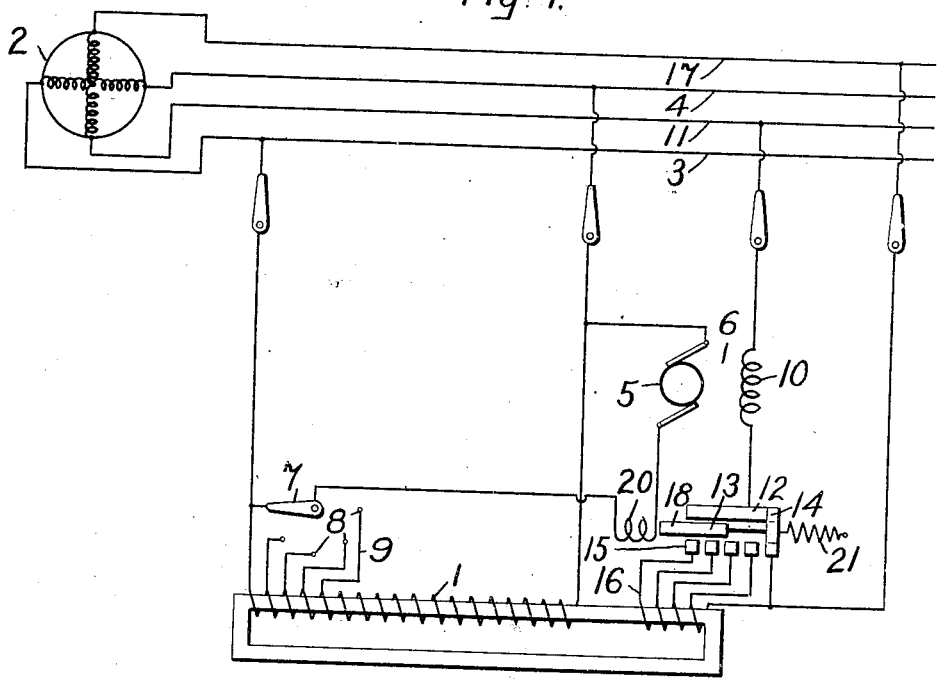

No. 840,001. PATENTED JAN. 1, 1907.
B. G. LAMME & C. RENSHAW.
METHOD OF REGULATING ALTERNATING CURRENT MOTORS.
APPLICATION FILED FEB. 6, 1905.

4 SHEETS—SHEET 1.

WITNESSES:
Fred. H. Miller
Otto S. Schairer.

INVENTORS
Benj. G. Lamme
& Clarence Renshaw
BY
Wesley G. Carr
ATTORNEY

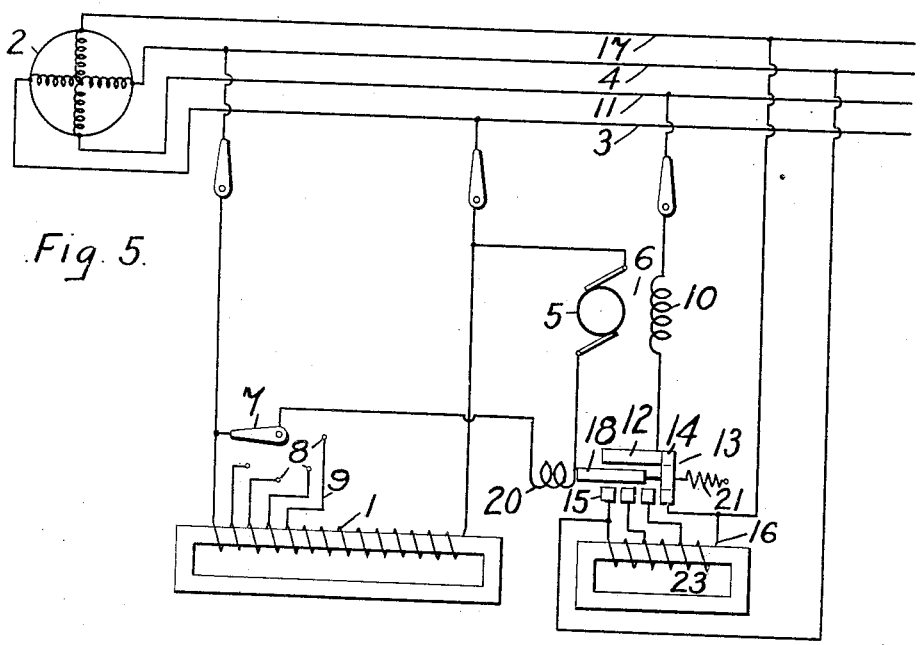

No. 840,001. PATENTED JAN. 1, 1907.
B. G. LAMME & C. RENSHAW.
METHOD OF REGULATING ALTERNATING CURRENT MOTORS.
APPLICATION FILED FEB. 6, 1905.

4 SHEETS—SHEET 4.

WITNESSES:
Fred. H. Miller
Otto S. Schairer

INVENTORS
Benj. G. Lamme
Clarence Renshaw
BY
Wesley G. Carr
ATTORNEY

UNITED STATES PATENT OFFICE.

BENJAMIN G. LAMME, OF PITTSBURG, AND CLARENCE RENSHAW, OF WILKINSBURG, PENNSYLVANIA, ASSIGNORS TO WESTINGHOUSE ELECTRIC & MANUFACTURING COMPANY, A CORPORATION OF PENNSYLVANIA.

METHOD OF REGULATING ALTERNATING-CURRENT MOTORS.

No. 840,001.     Specification of Letters Patent.     Patented Jan. 1, 1907.

Application filed February 6, 1905. Serial No. 244,482.

*To all whom it may concern:*

Be it known that we, BENJAMIN G. LAMME, residing at Pittsburg, and CLARENCE RENSHAW, residing at Wilkinsburg, in the county of Allegheny, State of Pennsylvania, citizens of the United States, have invented a new and useful Improvement in Methods of Regulating Alternating-Current Motors, of which the following is a specification.

Our invention relates to the regulation of alternating-current motors of the commutator type of construction; and its object is to provide a method of adjusting the phase relations with respect to each other of the currents in the armature and field-magnet windings of a motor, which shall insure the operation of the motor with a minimum armature-current for a given torque, and consequently at high efficiency and power factor.

In general motors of the commutator type of construction if properly designed may be operated efficiently by means of alternating currents, provided the currents in the armature and field-magnet windings reverse simultaneously, or nearly so.

If the armature and field circuits of a motor of the commutator type having laminated magnetic circuits are supplied with alternating electromotive forces differing ninety degrees in phase, the currents in the armature and field-magnet windings may reverse nearly simultaneously. This is true because the current supplied to the field-magnet winding may be largely a magnetizing or wattless current which lags nearly ninety degrees behind the electromotive force impressed upon that circuit, while the armature-circuit may be and is ordinarily made with but little self-induction, so that the current in this circuit lags but little behind the electromotive force impressed upon it. It is obvious, then, that if the electromotive forces applied to the two circuits differ ninety degrees in phase the currents in the armature and field-magnet circuits differ but little in phase. It has been found in practice, however, that in order to obtain minimum armature-current for a given torque with such a motor it is necessary that the currents in the armature and field circuits be more nearly coincident in phase than is the case if only the differences of the power factors of the circuits are depended upon to produce the proper relations. The insufficiency of the power-factor conditions of the circuits is partially due to the fact that the armature-circuits cannot be made entirely non-inductive. Moreover, when constant voltages are applied to the armature and field-magnet windings the amount of current in the field-magnet winding, as well as its phase relation with respect to the electromotive force applied to the winding, remains practically constant even under variations in the load upon the motor; but the amount of current in the armature-circuit varies according to the work which the motor is doing, and the phase relations of this current with respect to the electromotive force applied to the armature-winding varies as the amount of current varies. Thus the phase relations of the currents in the armature and field-magnet windings with respect to each other vary as the work done by the motor. With no load on the motor—*i. e.*, with but small currents flowing in the armature-circuit—the phase relations may be reasonably close to the desired relations; but as load is placed on the motor the phase relations with respect to each other of the armature and field currents change.

It is the purpose of this invention to provide a method of effecting the proper adjustment of the phase relations of the armature and field currents in order to obtain minimum armature-current for a given torque regardless of the load upon the motor.

Our invention is illustrated in the accompanying drawings, in which—

Figure 2:
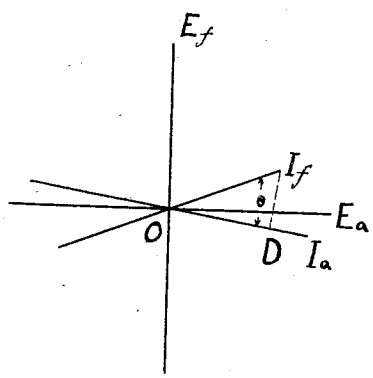
Figure 3:
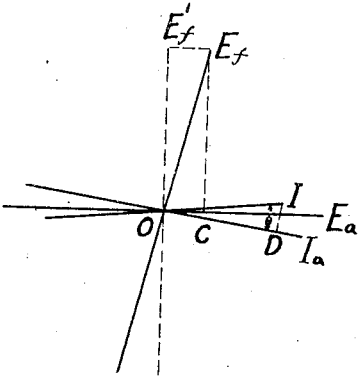
Figure 6:
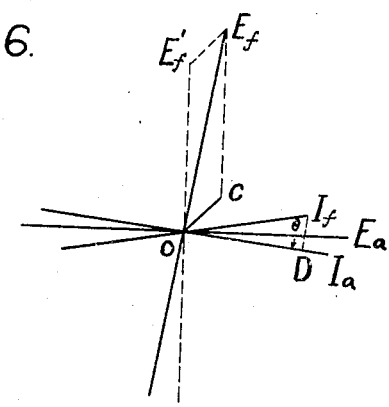
Figure 7:
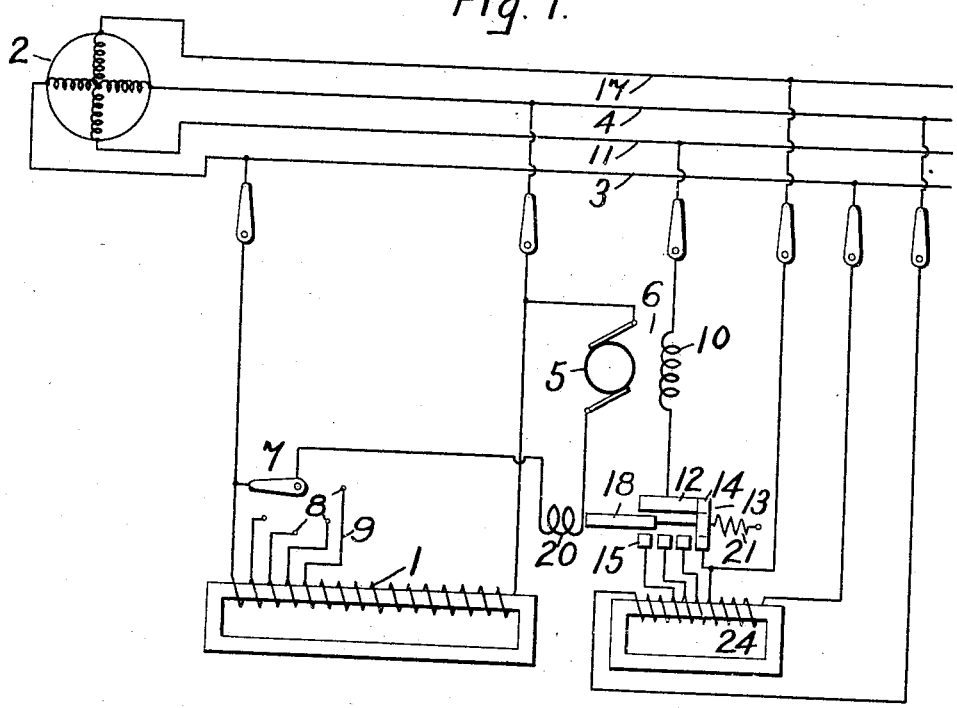
Figure 8:
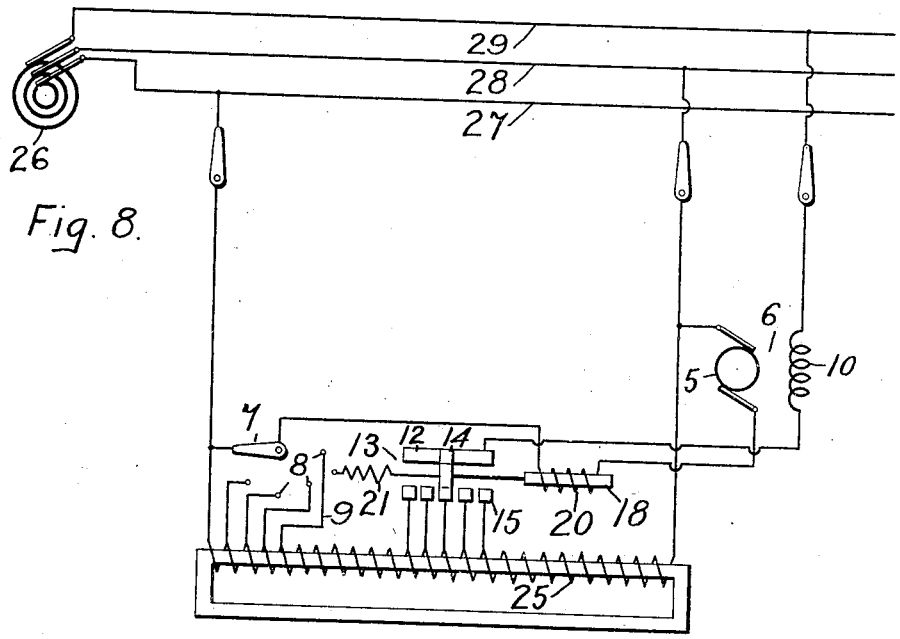
Figure 9:
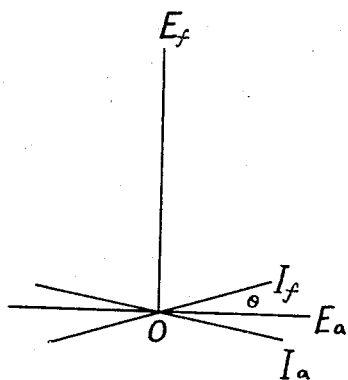
Figure 10:
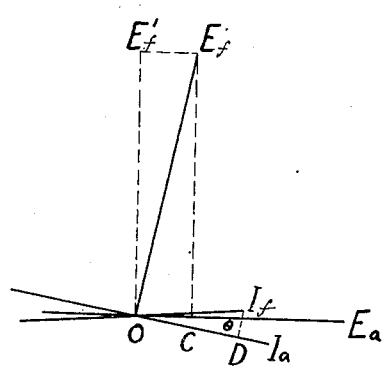

Figure 1 illustrates diagrammatically a motor supplied from a two-phase source, which is provided with a specific type of phase-adjusting means; and Figs. 2 and 3 are vector diagrams, illustrative of the approximate phase relations of the currents and electromotive forces in the motor shown in Fig. 1. Figs. 4, 5, and 7 are diagrammatic views illustrating modifications of the regulating devices which are shown in Fig. 1. Fig. 6 is a vector diagram of the approximate phase relations as they occur in the modification shown in Fig. 5. Fig. 8 illustrates diagrammatically a motor which is supplied from a three-phase source and which is also provided with means for effecting changes in the phase relations of the currents in the armature and field circuits; and Figs. 9 and 10 are vector diagrams, illustrating the approximate phase relations of the currents and electromotive forces in the motor of Fig. 8.

In Fig. 1 a transformer-winding 1 is supplied with energy from a two-phase generator 2, having a closed-coil armature-winding through conductors 3 and 4. Armature 5 of motor 6 derives its energy from the transformer-winding 1, a suitable means for varying the electromotive force applied to the armature-winding comprising a pivoted arm 7, adapted to engage contact-terminals 8, which are connected to spaced points in the transformer-winding 1 by means of leads 9.

One terminal of the field-magnet winding 10 of the motor 6 is connected to supply-conductor 11 and the other terminal is connected to a suitable conducting-strip 12 of a regulating device 13. A brush 14 is adapted to make sliding contact with the conducting-strip 12 and to engage contact-terminals 15, which are connected with suitable spaced points in a winding 16, which is placed in the same magnetic circuit as the transformer-winding 1 and one terminal of which is connected to supply-conductor 17. The brush 14 is carried by the magnetizable core 18 of a solenoid 20, which is connected in series with the motor-armature. A spring 21 is attached to the brush 14 in any suitable manner for the purpose of resisting the pull exerted by the solenoid 20. If the current in the armature-circuit increases, the brush 14 is moved so as to cut into the field-circuit more of the winding 16, and if the current in the armature-circuit decreases the spring 21 causes part of the winding 16 to be cut out of the field-circuit.

It is of course understood that the controlling device 13 is illustrative of any suitable means for varying the length of the winding 16 included in the field-circuit substantially in accordance with variations in the amount of current in the armature-circuit and that other devices for effecting this result may be employed within the scope of our invention.

An understanding of the approximate phase relations of the currents and electromotive forces in the armature and field-magnet windings under the different conditions may be obtained from a consideration of Figs. 2 and 3. In Fig. 2 we have shown the phase relations as they would occur in the motor if no auxiliary devices were employed for altering them. Lines $OE_a$ and $OE_f$ represent, respectively, the electromotive forces applied to the armature and field-magnet windings, and lines $OI_a$ and $OI_f$ represent in direction the currents in the armature and field-magnet windings. The angle $\Theta$ represents the phase difference between the currents in the armature and field-magnet windings.

It will be observed that in Fig. 3 the phase of the electromotive force $OE_f$ is indicated as shifted from the relation shown in Fig. 2 with respect to the electromotive force $OE_a$, since when a part or the whole of the transformer-winding 16 is included in the field-circuit the electromotive force $OE_f$ which is applied to the field-magnet winding is the resultant of the electromotive force $OE'_f$ that is derived from the supply-circuit and the electromotive force $OC$ that is derived from the winding 16, the electromotive force $OC$ being in phase with the electromotive force $OE_a$.

The angle $E_f OI_f$ is determined by the power factor of the field-circuit and remains the same in both cases. As above noted, the angle $E_f OE_a$ in Fig. 3 is less than the corresponding angle in Fig. 2, and hence the angle $\theta$ in Fig. 3 is less than the angle $\theta$ in Fig. 2. The field magnetism being proportional to and in phase with the field-current, the line $OI_f$ may represent the phase direction of the field magnetism as well as that of the field-current.

The torque exerted by the armature of such a motor as is hereinbefore described is proportional to the product of the armature-current $OI_a$ and that component $OD$ of the field magnetism which is in phase with the armature-current. It is evident that when the angle $\theta$ is a minimum the component $OD$ is a maximum and when the component $OD$ is a maximum—i. e., when the field and armature currents are most nearly in phase—the power-factor of the motor is a maximum and the armature-current a minimum for that particular torque.

It will be understood that the electromotive force represented by the line $OC$ may be chosen of such magnitude that the resultant electromotive force $OE_f$ and the corresponding current $OI_f$ may be shifted to bring the field-magnet current $OI_f$ and the armature-current $OI_a$ into phase with each other—i. e., so that the lines $OI_f$ and $OI_a$ will coincide in direction. While this is a desirable condition for operation and, as just stated, may be attained if the component forces are properly chosen, we have indicated relations that only approximate this condition, for the reason that such approximation may be more conveniently and clearly illustrated.

Various modifications of our invention, such as are shown in Figs. 4, 5, and 7, may be found of use in special cases, though in general they are not so economical in construction. In Fig. 4 the winding 16 is the secondary winding of a separate transformer 21ª, the primary winding 22 of which is connected between the same supply-conductors 3 and 4 as the transformer-winding 1.

The approximate phase relations of the currents and electromotive forces in the armature and field-magnet windings embodied in the system shown in Fig. 4 are substantially the same as in Fig. 3.

In Fig. 5 the winding 16 of an autotransformer 23 is connected to supply-conductors 4 and 17, the electromotive force between which differs in phase from that applied to the armature-circuits and also from that applied to the field-magnet circuit. The approximate phase relations are shown in Fig. 6, in which the electromotive force $OE_f$ impressed upon the field-magnet winding is the resultant of the electromotive force $OE'_f$ applied to the field-circuit and the electromotive force $OC$ derived from the winding 16.

An autotransformer winding 24 may also be connected between the same supply-conductors 3 and 4 as is the main transformer-winding 1, and the points of connection of the field-magnet winding therewith may be shifted in accordance with variations in the amount of current traversing the armature-circuit, substantially as shown in Fig. 7.

In Fig. 8 a transformer-winding 25 is supplied with one phase of the energy from a three-phase source 26 through supply-conductors 27 and 28, and, as before, the armature 5 of motor 6 derives its energy from the transformer-winding. One terminal of the field-magnet winding 10 is connected to the third supply-conductor 29 and the other terminal to the conducting-strip 12 of a regulator device 13, the details of which are similar to those shown in Fig. 1 and need not be further described. The contact-terminals 15, however, of the regulating device 13 are connected with points in the transformer-winding 25 near its middle, and the phase relations of the electromotive forces applied to the armature and field-magnet windings are varied substantially in accordance with variations in the amount of current traversing the armature-circuit by the automatic variation of the position of the brush 14.

The same reference characters are employed in Fig. 9 as in the previous figures for designating the phase relations of the currents and electromotive forces in the armature and field-magnet windings, and these phase relations are illustrated as they occur when the terminal of the field-magnet winding 10 is connected to the middle point of the transformer-winding 25.

Fig. 10 shows the phase relations of the currents and electromotive forces in the armature and field circuits as they are altered by a change in the position of the brush 14, it being observed that the angle $\theta$ is less in Fig. 10 than in Fig. 9.

While we have shown and described our invention as employed only for the purpose of altering the phase of the current in the field-magnet winding with respect to that of the current in the armature-winding, it is of course understood that if it is desired so to do the phase of the current in the armature-winding with respect to that of the current in the field-magnet winding may be adjusted in accordance with the same method and to meet the same or any other desired conditions.

Specific means for effecting adjustment of the phase relations of the currents in the armature and field-magnet windings form the subjects-matter of applications, Serial Nos. 244,475 and 244,476, filed by Benjamin G. Lamme, and of an application, Serial No. 244,481, filed by Clarence Renshaw, all of even date herewith.

We claim as our invention—

1. The method of maintaining approximately constant phase relations between the currents in two circuits, which consists in varying the phase relations of the applied electromotive forces approximately in accordance with the variations in the amount of current traversing one of the circuits.

2. The method of maintaining approximately constant phase relations between the currents in two circuits, which consists in combining with the electromotive force applied to one of the circuits an out-of-phase electromotive force and in varying the amount of said electromotive force approximately in accordance with the variations in the amount of current traversing one of the circuits.

3. The method of varying the phase relations of currents in different circuits, which consists in varying the phase relations of the electromotive forces applied to those circuits, substantially in accordance with variations in the phase difference between the current and electromotive force of the circuits.

4. The method of varying the phase relations of currents in different circuits, which consists in varying the phase relations of the electromotive forces applied to those circuits by combining with one of the electromotive forces an additional electromotive force of a different phase, and in varying the same substantially in accordance with variations in the phase difference between the current and electromotive force of the other circuit.

5. The method of varying the phase relations of currents in different circuits which consists in varying the phase relations of the electromotive forces applied to those circuits by combining with one of the electromotive forces an additional electromotive force derived from the other circuit, and in varying the same substantially in accordance with variations in the phase difference between the current and electromotive force of the circuit from which it is derived.

6. The method of adjusting the phase difference between the currents in the armature and field-magnet windings of a dynamo-electric machine which consists in applying a plurality of out-of-phase electromotive forces to the circuit of one of the windings and in varying one of the electromotive forces substantially in accordance with variations in the amount of current that traverses the other winding.

7. The method of adjusting the phase difference between the currents in the armature and field-magnet windings of a dynamo-electric machine which consists in applying a plurality of out-of-phase electromotive forces to the circuit of the field-magnet winding and in varying one of the electromotive forces substantially in accordance with variations in the amount of current that traverses the armature-winding.

8. The method of adjusting the phase difference between the currents in the armature and field-magnet windings of a dynamo-electric machine which consists in applying a plurality of out-of-phase electromotive forces to the circuit of one of the windings and in varying one of the electromotive forces substantially in accordance with variations in the phase difference between the current and electromotive force of the other winding.

9. The method of adjusting the phase difference between the currents in the armature and field-magnet windings of a dynamo-electric machine which consists in varying the phase relations of the electromotive forces applied to those windings, substantially in accordance with variations in the amount of current that traverses the armature-winding.

10. The method of adjusting the phase difference between the currents in the armature and field-magnet windings of a dynamo-electric machine which consists in varying the phase relations of the electromotive forces applied to those windings, substantially in accordance with variations in the phase difference between the current and electromotive force of one of the windings.

In testimony whereof we have hereunto subscribed our names this 3d day of February, 1905.

BENJ. G. LAMME.
CLARENCE RENSHAW.

Witnesses:
OTTO S. SCHAIRER,
BIRNEY HINES.